US012609138B2

(12) United States Patent　　　(10) Patent No.:　US 12,609,138 B2
Du　　　　　　　　　　　　　　　(45) Date of Patent:　Apr. 21, 2026

(54) MUSIC EXTENSION METHOD AND APPARATUS, ELECTRONIC DEVICE, AND STORAGE MEDIUM

(71) Applicant: Beijing Zitiao Network Technology Co., Ltd., Beijing (CN)

(72) Inventor: Cong Du, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 267 days.

(21) Appl. No.: 18/282,776

(22) PCT Filed: Mar. 11, 2022

(86) PCT No.: PCT/CN2022/080308
§ 371 (c)(1),
(2) Date: Sep. 18, 2023

(87) PCT Pub. No.: WO2022/194038
PCT Pub. Date: Sep. 22, 2022

(65) Prior Publication Data
US 2024/0170022 A1　　May 23, 2024

(30) Foreign Application Priority Data

Mar. 16, 2021　(CN) .......................... 202110283203.6

(51) Int. Cl.
*G11B 27/031*　　(2006.01)
*G06V 20/40*　　(2022.01)
*G10H 1/00*　　(2006.01)

(52) U.S. Cl.
CPC ............ *G11B 27/031* (2013.01); *G06V 20/46* (2022.01); *G10H 1/0008* (2013.01);
(Continued)

(58) Field of Classification Search
CPC ..... G11B 27/031; G06V 20/46; G10H 1/0008
See application file for complete search history.

(56) References Cited

U.S. PATENT DOCUMENTS 8,712,222 B2　4/2014　Suzuki
8,910,046 B2　12/2014　Matsuda et al.
(Continued)

FOREIGN PATENT DOCUMENTS

CN　　106658133 A　　5/2017
CN　　107393569 A　　11/2017
(Continued)

OTHER PUBLICATIONS

International Search Report in PCT/CN2022/080308, mailed May 27, 2022, 5 pages.
(Continued)

*Primary Examiner* — Mishawn N. Hunter
(74) *Attorney, Agent, or Firm* — Astute IP Law Group

(57) ABSTRACT

Provided are a music extension method and apparatus, an electronic device, and a storage medium. The music extension method includes the following: receiving a target triggering operation of extending to-be-extended music; in response to the target triggering operation, determining a target music segment according to the music feature of the to-be-extended music; and splicing the target music segment to the target position of the to-be-extended music to obtain extended target music.

20 Claims, 7 Drawing Sheets

(52) U.S. Cl.
CPC . *G10H 2210/021* (2013.01); *G10H 2210/071* (2013.01); *G10H 2220/101* (2013.01)

(56) References Cited

U.S. PATENT DOCUMENTS

| | | | | |
|---|---|---|---|---|
| 9,838,731 | B1 | 12/2017 | Matias | |
| 12,176,008 | B2 * | 12/2024 | Feng | G10H 1/40 |
| 2008/0264241 | A1 | 10/2008 | Lemons | |
| 2013/0046536 | A1 * | 2/2013 | Lu | G10L 25/78 704/E15.039 |
| 2017/0115956 | A1 * | 4/2017 | Zalon | G10L 25/48 |
| 2022/0121623 | A1 * | 4/2022 | Lyske | G06F 9/52 |

FOREIGN PATENT DOCUMENTS

| | | |
|---|---|---|
| CN | 108401124 A | 8/2018 |
| CN | 108597546 A | 9/2018 |
| CN | 110740262 A | 1/2020 |
| CN | 110781349 A | 2/2020 |
| CN | 111309962 A | 6/2020 |
| CN | 111741233 A | 10/2020 |
| CN | 112153307 A | 12/2020 |
| CN | 112445395 A | 3/2021 |
| CN | 113038260 A | 6/2021 |
| TW | 200630848 A | 9/2006 |
| WO | 2014048576 A2 | 4/2014 |

OTHER PUBLICATIONS

Office Action in CN202110283203.6, mailed Apr. 19, 2022, 7 pages.
Office Action in CN202110283203.6, mailed Nov. 23, 2022, 5 pages.
Office Action and Search Report in CN202110283203.6, mailed Apr. 6, 2023, 8 pages.
Notice of Rejection in CN202110283203.6, mailed Jul. 20, 2023, 5 pages.
Extended European Search Report for European Patent Application No. 22770393.1, mailed on Aug. 26, 2024, 4 pages.
Office Action for European Patent Application No. 22770393.1, mailed on Sep. 20, 2024, 7 pages.

* cited by examiner

Receive a target triggering operation of extending to-be-extended music　　S101

In response to the target triggering operation, determine a target music segment according to a music feature of the to-be-extended music　　S102

Splice the target music segment to a target position of the to-be-extended music to obtain extended target music　　S103

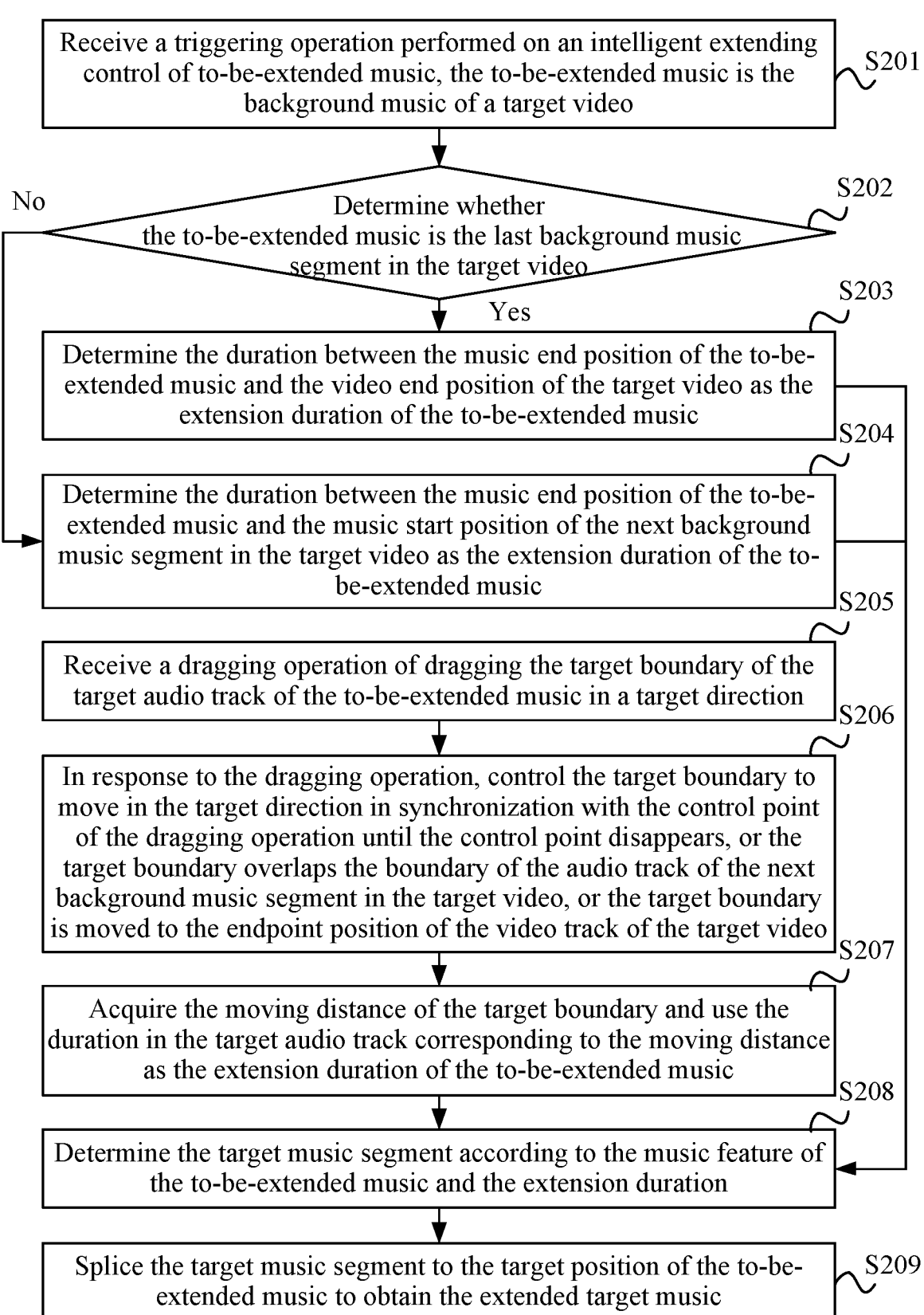

Receive a triggering operation performed on an intelligent extending control of to-be-extended music, the to-be-extended music is the background music of a target video   S201

Determine whether the to-be-extended music is the last background music segment in the target video   S202

No

Yes

Determine the duration between the music end position of the to-be-extended music and the video end position of the target video as the extension duration of the to-be-extended music   S203

Determine the duration between the music end position of the to-be-extended music and the music start position of the next background music segment in the target video as the extension duration of the to-be-extended music   S204

Receive a dragging operation of dragging the target boundary of the target audio track of the to-be-extended music in a target direction   S205

In response to the dragging operation, control the target boundary to move in the target direction in synchronization with the control point of the dragging operation until the control point disappears, or the target boundary overlaps the boundary of the audio track of the next background music segment in the target video, or the target boundary is moved to the endpoint position of the video track of the target video   S206

Acquire the moving distance of the target boundary and use the duration in the target audio track corresponding to the moving distance as the extension duration of the to-be-extended music   S207

Determine the target music segment according to the music feature of the to-be-extended music and the extension duration   S208

Splice the target music segment to the target position of the to-be-extended music to obtain the extended target music   S209

FIG. 3

MUSIC EXTENSION METHOD AND APPARATUS, ELECTRONIC DEVICE, AND STORAGE MEDIUM

CROSS-REFERENCE TO RELATED APPLICATIONS

This is a National Stage Application, filed under 35 U.S.C. 371, of International Patent Application No. PCT/CN2022/080308, filed on Mar. 11, 2022, which claims priority to Chinese Patent Application No. 202110283203.6 filed with the China National Intellectual Property Administration (CNIPA) on Mar. 16, 2021, the disclosures of which areis incorporated herein by reference in their entireties.

TECHNICAL FIELD

The present disclosure relates to the field of computer technology, for example, a music extension method and apparatus, an electronic device, and a storage medium.

BACKGROUND

Users may produce videos and add background music to the produced videos.

SUMMARY

The present disclosure provides a music extension method and apparatus, an electronic device, and a storage medium, so as to take both the ease of operation during background music extension and the extension effect of the background music into account.

The present disclosure provides a music extension method. The method includes the steps below.

A target triggering operation of extending to-be-extended music is received.

In response to the target triggering operation, a target music segment is determined according to a music feature of the to-be-extended music.

The target music segment is spliced to a target position of the to-be-extended music to obtain extended target music.

The present disclosure also provides a music extension apparatus. The apparatus includes an operation receiving module, a segment determination module, and a first extension module.

The operation receiving module is configured to receive the target triggering operation of extending the to-be-extended music.

The segment determination module is configured to, in response to the target triggering operation, determine a target music segment according to a music feature of the to-be-extended music.

The first extension module is configured to splice the target music segment to a target position of the to-be-extended music to obtain extended target music.

The present disclosure also provides an electronic device. The electronic device includes one or more processors and a memory configured to store one or more programs.

When executing the one or more programs, the one or more processors are caused to perform the preceding music extension method.

The present disclosure also provides a computer-readable storage medium. The storage medium stores a computer program. When executing the computer program, a processor is caused to perform the preceding music extension method.

BRIEF DESCRIPTION OF DRAWINGS

FIG. 3 is a flowchart of another music extension method according to an embodiment of the present disclosure.

DETAILED DESCRIPTION

Embodiments of the present disclosure are described below with reference to the drawings. The drawings illustrate some embodiments of the present disclosure, but the present disclosure may be implemented in various manners. These embodiments are provided for an understanding of the present disclosure. The drawings and embodiments of the present disclosure are merely illustrative.

The various steps recited in method embodiments of the present disclosure may be performed in a different order and/or in parallel. In addition, the method embodiments may include additional steps and/or omit execution of illustrated steps. The scope of the present disclosure is not limited in this respect.

As used herein, the term "include" and variations thereof are intended to be inclusive, that is, "including, but not limited to". The term "based on" is "at least partially based on". The term "one embodiment" means "at least one embodiment"; the term "another embodiment" means "at least one another embodiment"; and the term "some embodiments" means "at least some embodiments". Related definitions of other terms are given in the description hereinafter.

Concepts such as "first" and "second" in the present disclosure are merely intended to distinguish one from another apparatus, module or unit and are not intended to limit the order or interrelationship of the functions performed by the apparatus, module, or unit.

References to modifications of "one" or "a plurality" mentioned in the present disclosure are intended to be illustrative and not limiting; and those skilled in the art should understand that "one" or "a plurality" should be understood as "one or more" unless expressed in the context.

The names of messages or information exchanged between multiple apparatuses in the embodiments of the present disclosure are only for illustrative purposes and are not intended to limit the scope of such messages or information.

When background music is added, sometimes the length of the background music is smaller than the length of a video. In the related art, a user may play the background music in a loop, or select and configure other background music for the part of the video that exceeds the length of the background music, or the user may use professional editing tools to edit the background music to extend the background music to an expected length.

However, the extended background music obtained by using the extension method in which the background music is played in a loop or other background music is configured has a relatively poor music effect, and the use of professional editing tools to edit the background music requires relatively professional operations, the editing is relatively difficult, and the requirements of the user cannot be satisfied.

Figure 1:
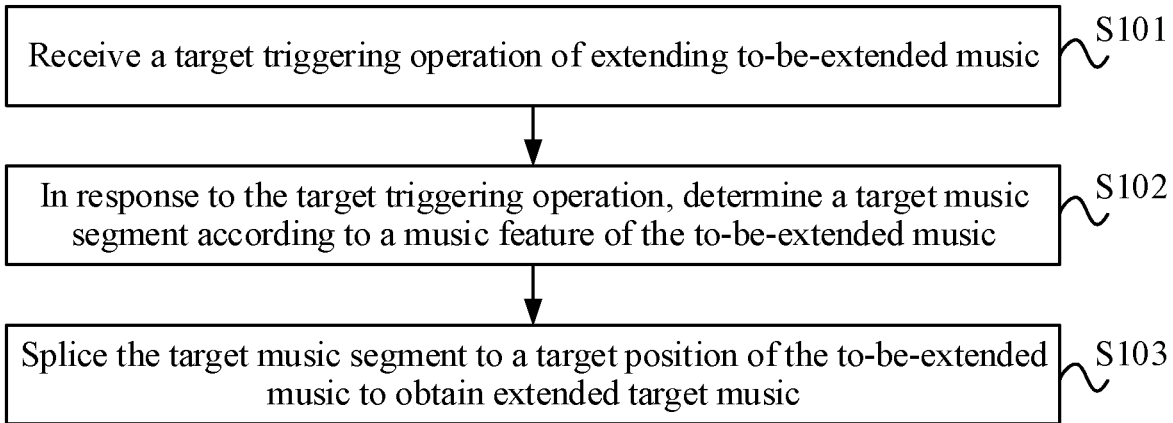
FIG. 1 is a flowchart of a music extension method according to an embodiment of the present disclosure.

In view of the above, the present disclosure provides a music extension method. FIG. 1 is a flowchart of a music extension method according to an embodiment of the present disclosure. This method may be executed by a music extension apparatus. The apparatus may be performed by software and/or hardware and may be configured in an electronic device. For example, the apparatus may be configured in a mobile phone or a tablet computer. The music extension method provided by this embodiment of the disclosure is applied to a scenario in which the background music of a video is extended when the video is produced. As shown in FIG. 1, the music extension method provided by this embodiment may include the following steps.

In S101, a target triggering operation of extending to-be-extended music is received.

The to-be-extended music may be background music in a target video and currently needs to be extended, for example, the to-be-extended music is background music in a selected state when the target triggering operation is received. Accordingly, the target video may be a video to which the to-be-extended music belongs. The target triggering operation may be a triggering operation triggered by a user for instructing an electronic device to extend the to-be-extended music, such as an operation of triggering an intelligent extending control of the to-be-extended music or an operation of dragging the boundary of the to-be-extended music in the direction of extending the audio track of the to-be-extended music, such an operation may be performed on an editing interface of the target video.

For example, the electronic device displays the creation home interface of a video application (such as a mobile-terminal video application). The creation home interface may be provided with a shooting control and an uploading control. Thus, the user may shoot a video by triggering the shooting control or upload a video by triggering the uploading control. When a video is shot or uploaded, in response to the completion of shooting or uploading, the editing interface of the video is displayed. The user may edit the video on the editing interface of the video. For example, the editing interface of the video may display a music control. The user may add and use music as the background music of the video by triggering the music control. In addition, when the duration of the added music does not reach the expected duration, the user may also instruct the electronic device to extend the music by performing a corresponding triggering operation.

Figure 2:
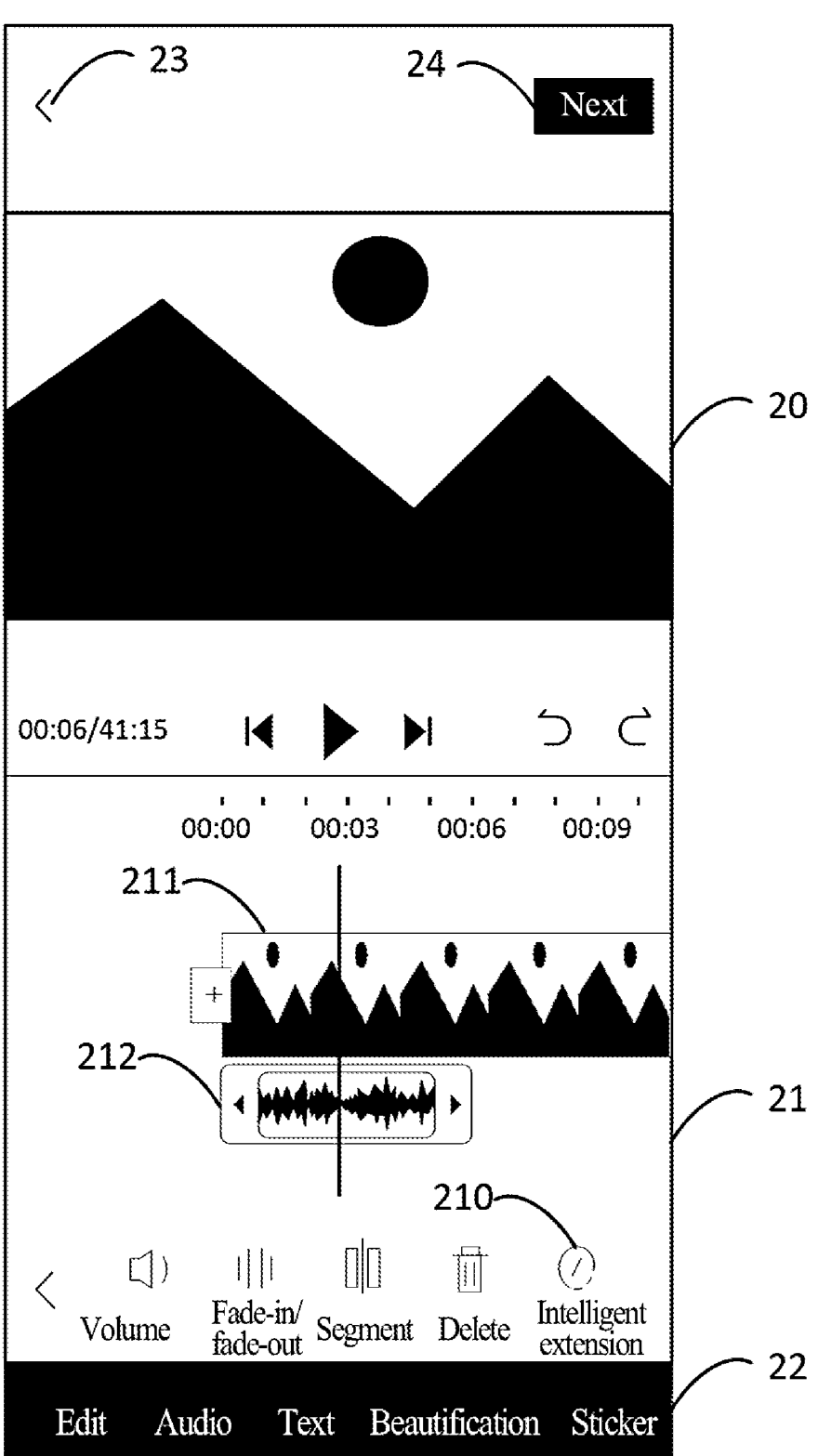
FIG. 2 is a diagram illustrating an editing interface according to an embodiment of the present disclosure.

In this embodiment, as shown in FIG. 2, a preview area 20, an editing area 21, and a control area 22 may be provided on the editing interface of a video (such as the target video). The control area 22 may be provided with an editing control, an audio control, a text control, a beautification control, and a sticker control. In this manner, the user may instruct the electronic device to display the corresponding editing content in the editing area 21 by triggering the corresponding control displayed in the control area 22, so that the user may perform a corresponding editing operation.

For example, the user may instruct the electronic device to display video editing content/audio editing content/text editing content/special effect editing content/sticker editing content in the editing area 21 by triggering the editing control/audio control/text control/beautification control/sticker control to edit the image/audio (such as the background music)/text/special effect/sticker in the video and may view the edited target video in the preview area 20.

In addition, the editing interface may also be provided with a return control 23 and a next control 24. In this manner, the user may instruct the electronic device to switch the current display interface from the editing interface to the previous interface (for example, the creation home interface) of the editing interface by triggering the return control 23 and may instruct the electronic device to switch the current display interface from the editing interface to the next interface of the editing interface by triggering the next control 24, so that the user may perform the next operation. For example, the user may instruct the electronic device to switch the current display interface from the editing interface to a posting interface, so that the user may publish the target video.

In this embodiment, the user may edit the background music in the target video, for example, when the background music in the target video does not reach the expected length, the user may extend the background music in the target video to the same length as the target video (for example, the music start time corresponds to the video start time) to match the target video.

The electronic device displays the editing interface of the target video and displays the audio editing content of the target video in the editing area of the editing interface. In this manner, when the user intends to extend the background music (that is, the to-be-extended music) in the target video, the user may select the background music (for example, click the audio track of the background music) and perform a triggering operation for extending the background music in the editing area. Accordingly, when the electronic device detects the triggering operation of the user for extending the background music, the background music may be used as the to-be-extended music, and it is determined that the target triggering operation of extending the to-be-extended music is received.

In S102, in response to the target triggering operation, a target music segment is determined according to a music feature of the to-be-extended music.

The target music segment may be understood as a music segment used to be spliced to an end of the to-be-extended music and/or to be spliced to one or more positions in the middle portion of the to-be-extended music to extend the music duration of the to-be-extended music. The music segment belongs to the same piece of music as the to-be-extended music or to different pieces of music from the to-be-extended music. The music feature of the to-be-extended music is, for example, the music rhythm, the music melody, and the music type. The target music segment may include multiple segments. The music type may be divided according to different classification systems, such as duration, timbres, ages, contents, and/or attributes. The music feature may be the music feature of the original music corresponding to the to-be-extended music, that is, the music feature of the original music corresponding to the to-be-extended music may be used as the music feature of the to-be-extended music.

In this embodiment, the target music segment used for extending the to-be-extended music is selected according to the music feature of the to-be-extended music, so that the music feature of the music segment spliced to the to-be-extended music matches the music feature of the to-be-extended music. Thus, the switching between the to-be-extended music and the target music segment is not too abrupt, and the smoothness of the extended music is improved.

When the electronic device receives the target triggering operation for the to-be-extended music, the electronic device may first acquire the music feature of the to-be-extended music. For example, the electronic device acquires the music feature of the original music corresponding to the to-be-extended music that is pre-analyzed and stored in a server, or the electronic device analyzes the to-be-extended music to obtain the music feature of the to-be-extended music. Then, a music segment corresponding to the music feature is acquired and used as the target music segment. For example, a music segment whose music feature is aligned with the music feature of the to-be-extended music is acquired from the original music corresponding to the to-be-extended music and used as the target music segment based on a preset acquisition rule. Alternatively, a music segment whose music feature is aligned with the music feature of the to-be-extended music is acquired from other music in a music library and used as the target music segment based on the preset acquisition rule.

When there are multiple music segments whose music features are aligned with the music feature of the to-be-extended music, a music segment whose music feature is best aligned with the music feature of the to-be-extended music may be acquired from the multiple music segments and used as the target music segment.

In this embodiment, when the target music segment is determined according to the music feature of the to-be-extended music, if the music feature is the music rhythm, the to-be-extended music includes a prelude segment, an intermediate segment, and an end segment. When the extension is performed on the end of the to-be-extended music, that is, a target position is the end of the to-be-extended music, a music segment whose rhythm is the same as the rhythm of the end segment may be selected and used as the target music segment. Thus, the smoothness of the extended target music is improved.

When the electronic device receives the target triggering operation, the electronic device may first analyze the to-be-extended music, determine a preset music segment (such as the prelude segment, the intermediate segment, and/or the end segment) of the to-be-extended music and the position of the preset music segment in the to-be-extended music, and use the preset music segment as the target music segment. Alternatively, a sub-music segment whose duration matches the extension duration of the to-be-extended music is acquired from the preset music segment and used as the target music segment. Then, the target music segment is spliced to the position of the preset music segment in the to-be-extended music, and the target music segment is spliced to a segment of the preset music segment in the to-be-extended music.

In addition, the target position may be between the intermediate segment and the end segment, that is, after the target music segment is determined, the intermediate segment and the end segment may be automatically identified and segmented. The target music segment is spliced between the intermediate segment and the end segment to form the final target music.

In this embodiment, when the target music segment is selected, the extension duration of the to-be-extended music may be considered or not. For example, the extension duration of the to-be-extended music may not be considered, the target music segment is determined only according to the music feature of the to-be-extended music. The target music segment is adjusted to the appropriate duration based on the editing operation of the user after splicing. The extension duration of the to-be-extended music may be considered, and at the same time, the target music segment is determined according to the music feature of the to-be-extended music and the extension duration. This is not limited in this embodiment.

To simplify the operations that the user needs to perform when the music is extended, in this embodiment, the target music segment is determined according to the music feature of the to-be-extended music and the extension duration at the same time. At this time, before the target music segment is determined according to the music feature of the to-be-extended music, the method also includes determining the extension duration of the to-be-extended music based on the target triggering operation. The step in which the target music segment is determined according to the music feature of the to-be-extended music includes that the target music segment is determined according to the music feature of the to-be-extended music and the extension duration. The extension duration may be understood as the duration that the to-be-extended music needs to be extended by using the target music segment, that is, the duration of the target music segment.

When the electronic device receives the target triggering operation of extending the to-be-extended music, the electronic device may determine the extension duration of the to-be-extended music according to a preset extension duration determination rule, acquire a music segment whose music feature is aligned with the music feature of the to-be-extended music and whose duration is the extension duration of the to-be-extended music, and use the music segment as the target music segment. Herein, the extension duration determination rule may be flexibly set. For example, the difference between the expected duration of the to-be-extended music and the current duration of the to-be-extended music may be calculated, and the difference is used as the extension duration of the to-be-extended music. Alternatively, the duration in which the to-be-extended music is extended to the end of the original music to which the to-be-extended music belongs is determined, the difference between the expected duration of the to-be-extended music and the preceding determined duration is calculated, and the difference is used as the extension duration of the to-be-extended music.

In an embodiment, the step in which the target music segment is determined according to the music feature of the to-be-extended music and the extension duration includes the following: A music segment whose duration matches the extension duration is intercepted from the original music corresponding to the to-be-extended music and used as the target music segment according to the music feature of the to-be-extended music; or according to the music feature of the to-be-extended music, similar music of the to-be-extended music is determined, and a music segment whose duration matches the extension duration is intercepted from the similar music and used as the target music segment.

The original music may be music corresponding to the to-be-extended music, that is, music corresponding to the to-be-extended music without any editing. For example, the original music may be the to-be-extended music (for the case where no editing is performed by a user) or music corresponding to the to-be-extended music before editing (for the case where the editing is performed by the user).

In the preceding embodiment, the electronic device may intercept a music segment whose duration is the extension duration of the to-be-extended music and whose music feature is best aligned with the music feature of the to-be-extended music from the to-be-extended music or other music, and use the intercepted music segment as the target music segment.

For example, the electronic device may acquire the music feature of the original music corresponding to the to-be-extended music and intercept, from the original music, a music segment (for example, a music segment including the refrain part of the original music) whose music feature is best aligned with the music feature of the to-be-extended music and whose duration is the extension duration of the to-be-extended music and use the intercepted music segment as the target music segment according to the music feature of the to-be-extended music and the music feature of the original music. The electronic device may also first calculate the similarity between other music and the to-be-extended music according to the music feature of the to-be-extended music and the music features of other music in the music library and determine the music having the highest similarity as the similar music of the to-be-extended music. Then, a music segment whose music feature is best aligned with the music feature of the to-be-extended music and whose duration is the extension duration of the to-be-extended music is intercepted from the similar music and used as the target music segment according to the music feature of the to-be-extended music and the music feature of the similar music.

In this embodiment, to enable the determined target music segment to match the video content of the target video, when the target music segment is determined, in addition to considering the music feature of the to-be-extended music, it is also possible to consider the video feature of the target video to which the to-be-extended music is added. For example, a music segment that matches both the music feature of the to-be-extended music and the video feature of the target video is selected and used as the target music segment. At this time, the to-be-extended music is the background music of the target video. Before the target music segment is determined according to the music feature of the to-be-extended music, the method also includes determining the video feature of the target video. The target music segment is determined according to the music feature of the to-be-extended music in the following manner: The target music segment is determined according to the music feature of the to-be-extended music and the video feature. The video feature of the target video may be the video type and the video rhythm. For example, if the video type is love, a music segment is intercepted from love music and used as the target music segment. If the video type is the video rhythm, and in the part of the video without corresponding background music, the first n1 minutes (for example, 2 minutes) are the video title, the middle n2 minutes (for example, 3 minutes) are the intermediate video, and the last n3 minutes (for example, 2 minutes) are the end video, a music segment in which the first n1 minutes are the prelude, the middle n2 minutes are the intermediate, and the last n3 minutes are the end is selected and used as the target music segment. In an embodiment, the target position may also be determined according to the audio feature and/or the video feature.

In S103, the target music segment is spliced to a target position of the to-be-extended music to obtain extended target music.

The target music may be understood as music obtained by extending the to-be-extended music, that is, the to-be-extended music after the extension. The target music segment may include multiple segments. Accordingly, the target position may include multiple positions. The multiple positions may be multiple positions in the to-be-extended music. After the user triggers the operation of extending the to-be-extended music, the multiple segments are spliced to the multiple positions in the to-be-extended music.

In this embodiment, after the target music segment is acquired, the target position of the to-be-extended music may be determined. For example, a preset position (such as the start position, end position, or one or more positions in the middle part of the to-be-extended music) is determined as the target position, and splicing is performed at the target position. Alternatively, the target position is determined based on the target triggering operation of the user. For example, when the target triggering operation is a dragging operation of dragging the boundary of the target audio track of the to-be-extended music in the direction of extending an audio track, the target position may be determined as the end of the to-be-extended music corresponding to the boundary dragged by the dragging operation. Then, the target music segment is spliced to the target position of the to-be-extended music. For example, when the target position is the start position of the to-be-extended music, the end of the target music segment may be connected to the start of the to-be-extended music. When the target position is the end position of the to-be-extended music, the start of the to-be-extended music may be connected to the end of the target music segment. When the target position is any position in the middle part of the to-be-extended music, that is, the to-be-extended music is divided into two parts at any position. Accordingly, the target music segment may be spliced between these two parts. The corresponding relationship between the two parts and the video frames of the video may be adaptively adjusted so that the target music segment may be filled between the two parts.

In addition, in the case where the music feature is the music rhythm, and the target music segment is a segment extracted from the to-be-extended music, a prelude segment in the to-be-extended music may be extracted and used as a target prelude segment, an intermediate segment in the to-be-extended music may be extracted and used as a target intermediate segment, and an end segment in the to-be-extended music may be extracted and used as a target end segment. The three segments are spliced to the corresponding segments of the to-be-extended music to form the final extended target music. Thus, compared with directly splicing or looping at the end of music, in this embodiment, the smoothness of music can be improved, the user experience can be enriched, and the flexibility of music configuration can be increased.

To improve the smoothness of the extended target music, in this embodiment, a corresponding splicing effect may be added to the position at which the target music segment is spliced to the to-be-extended music. At this time, after the target music segment is spliced to the target position of the to-be-extended music, the method also includes adding a corresponding splicing effect to the to-be-extended music and the target music segment respectively. The splicing effect may be a fade-in and fade-out effect. For example, when the to-be-extended music is located in front of the target music segment, a fade-out effect may be added to the to-be-extended music, and a fade-in effect may be added to the target music segment. When the to-be-extended music is located after the target music, a fade-in effect may be added to the to-be-extended music, and a fade-out effect may be added to the target music segment.

In the music extension method provided by this embodiment, the target triggering operation of extending to-be-extended music is received. In response to the target triggering operation, the target music segment is determined according to the music feature of the to-be-extended music, and the target music segment is spliced to the target position of the to-be-extended music to obtain the extended target music. In the preceding technical schemes adopted by this embodiment, the user may instruct the electronic device to automatically use the target music segment corresponding to the music feature of the to-be-extended music to extend the to-be-extended music by performing a simple triggering operation. In this manner, the operation required for extending the music can be simplified, and at the same time, a too-abrupt switching between the to-be-extended music and the target music segment can be avoided. At the same time, the ease of operation during music extension and the extension effect of the music are considered, and the user experience is improved.

FIG. 3 is a flowchart of another music extension method according to an embodiment of the present disclosure. The schemes in this embodiment may be combined with one or more optional schemes in the preceding embodiment. In an embodiment, the to-be-extended music is the background music of the target video. The target triggering operation includes a triggering operation performed on an extension control of the to-be-extended music. The step in which the extension duration of the to-be-extended music is determined based on the target triggering operation includes the following: If the to-be-extended music is the last segment of the background music in the target video, the duration between the music end position of the to-be-extended music and the video end position of the target video is determined as the extension duration of the to-be-extended music; and if the to-be-extended music is not the last segment of the background music in the target video, the duration between the music end position of the to-be-extended music and the music start position of the next background music segment in the target video is determined as the extension duration of the to-be-extended music. The next segment of music is background music after the to-be-extended music and adjacent to the to-be-extended music.

In an embodiment, the to-be-extended music is the background music of the target video. The target triggering operation includes a dragging operation of dragging the target boundary of the target audio track of the to-be-extended music in a target direction. The step in which the extension duration of the to-be-extended music is determined based on the target triggering operation includes the following: The target boundary is controlled to move in the target direction in synchronization with a control point of the dragging operation until the control point disappears, or the target boundary overlaps the boundary of the audio track of the next background music segment in the target video, or the target boundary is moved to the endpoint position of the video track of the target video; and the moving distance of the target boundary is acquired, and the duration corresponding to the moving distance in the target audio track is used as the extension duration of the to-be-extended music.

Accordingly, as shown in FIG. 3, the music extension method provided by this embodiment may include the following steps.

In S201, a triggering operation performed on an intelligent extending control of the to-be-extended music is received. The to-be-extended music is the background music of the target video.

In S202, in response to the triggering operation, whether the to-be-extended music is the last segment of the background music in the target video is determined. If the to-be-extended music is the last segment of the background music in the target video, S203 is performed. If the to-be-extended music is not the last segment of the background music in the target video, S204 is performed.

The triggering operation performed on the intelligent extending control of the to-be-extended music may be any triggering operation that triggers the intelligent extending control of the to-be-extended music.

In this embodiment, the intelligent extending control may also be displayed on the editing interface of the target video. When the duration of the background music does not reach the expected duration, the user may instruct the electronic device to extend the to-be-extended music by triggering the intelligent extending control of the to-be-extended music, that is, the duration of the background music may be extended to the appropriate duration with one click. In addition, the return control may be disposed on the editing interface of the target video. Thus, after the intelligent extending control is triggered, the user may also trigger the return control to undo the music extension operation and restore the music to the original duration. One or more background music segments may be added to the target video. The to-be-extended music may be the last background music segment added to the target video or may not be the last background music segment added to the target video. When the to-be-extended music is and is not the last background music segment added to the target video, the extension duration of the to-be-extended music may be determined in different manners.

Compared with the related art, in this embodiment, an intelligent extending control is displayed on the editing interface. The duration of music may be extended to the video duration with one click. The operation is simple, and there is no need to switch between multiple applications (such as a video creation application and a video editing application), thereby improving the user experience.

As shown in FIG. 2, the electronic device displays the editing interface of the target video and also displays the audio editing content (including the intelligent extending control 210) of the to-be-extended music in the editing area 21 of the editing interface. When the user intends to extend the to-be-extended music, the user may trigger the intelligent extending control 210. Accordingly, when the electronic device detects that the user triggers the intelligent extending control 210, it is determined that a triggering operation performed on the to-be-extended music is received. In response to the trigger operation, whether the to-be-extended music is the last background music segment added to the target video is determined. For example, it is determined whether other background music is added after the to-be-extended music in the audio track of the target video to which the to-be-extended music belongs. If no other background music is added, it is determined that the to-be-extended music is the last background music segment added to the target video. If other background music is added, it is determined that the to-be-extended music is not the last background music segment added to the target video.

In S203, the duration between the music end position of the to-be-extended music and the video end position of the target video is determined as the extension duration of the to-be-extended music, and then S208 is performed.

The music end position of the to-be-extended music may be understood as the end position of the to-be-extended music, that is, the end of the to-be-extended music. The video end position of the target video may be understood as the end position of the target video, that is, the end of the target video.

In this embodiment, when the to-be-extended music is the last background music segment added to the target video, the to-be-extended music may be directly extended to the end position of the target video. At this time, the duration between the music end position of the to-be-extended music and the video end position of the target video is determined as the extension duration of the to-be-extended music. For example, the difference between the time value corresponding to the video end position of the target video in the target video and the time value corresponding to the music end position of the to-be-extended music in the target video may be calculated, and the difference is used as the extension duration of the to-be-extended music.

In S204, the duration between the music end position of the to-be-extended music and the music start position of the next background music segment in the target video is determined as the extension duration of the to-be-extended music. The next music segment is the background music after the to-be-extended music and adjacent to the to-be-extended music. Then, S208 is performed.

The next background music segment in the target video may be background music located behind and adjacent to the to-be-extended music in the audio track where the to-be-extended music is located. The music start position of the next background music segment may be understood as the start position of the next background music segment, that is, the start of the next music segment.

In this embodiment, when the to-be-extended music is not the last background music segment added to the target video, that is, when other background music is added after the to-be-extended music, the to-be-extended music may be extended to the music start position of the next background music segment. At this time, the duration between the music end position of the to-be-extended music and the music start position of the next background music segment is determined as the extension duration of the to-be-extended music. For example, the difference between the time value corresponding to the music start position of the next background music segment in the target video and the time value corresponding to the music end position of the to-be-extended music in the target video may be calculated, and the difference is used as the extension duration of the to-be-extended music.

The electronic device may preferentially extend the to-be-extended music by using the original music segment located after the to-be-extended music in the original music. When it is determined that the duration of the to-be-extended music still does not reach the expected duration after the to-be-extended music is extended by using the original music, the target music segment is used to extend the to-be-extended music, so that the smoothness of the extended target music is improved.

The electronic device may extend the to-be-extended music by using the original music segment located after the to-be-extended music in the original music. When it is determined that the duration of the to-be-extended music still does not reach the expected duration after the to-be-extended music is extended by using the original music, the target music segment is used to extend the to-be-extended music, so that the smoothness of the extended target music is improved.

Figure 4:
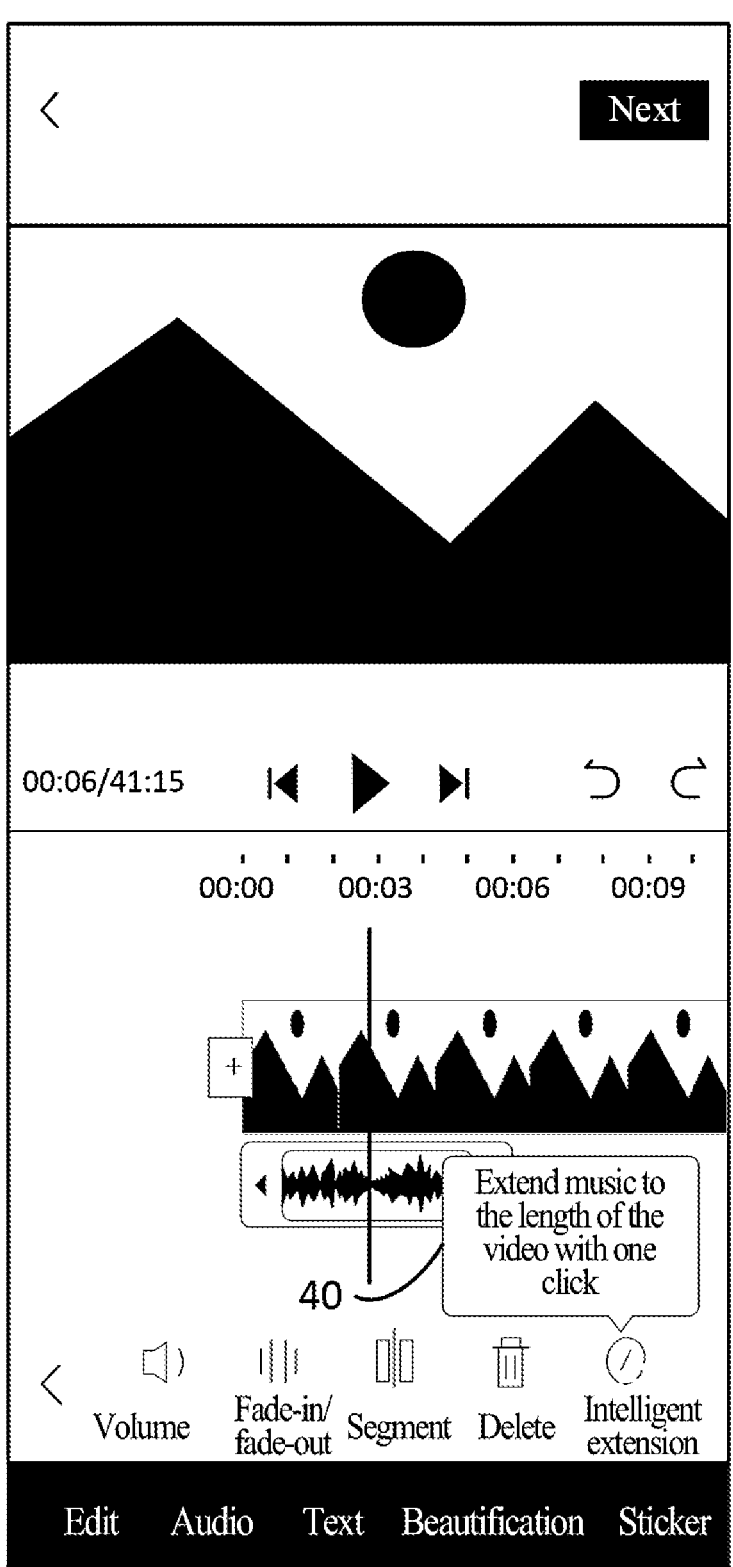
FIG. 4 is a diagram illustrating an intelligent extension reminder window according to an embodiment of the present disclosure.

In addition, as shown in FIG. 4, when the audio editing content is presented to the user for the first time in the editing area, that is, when the user views the audio editing content for the first time, an intelligent extension reminder window 40 may also be displayed to remind the user that the music may be extended to a length matching the video by triggering the intelligent extending control.

In S205, a dragging operation of dragging the target boundary of the target audio track of the to-be-extended music in the target direction is received.

In S206, in response to the dragging operation, the target boundary is controlled to move in the target direction in synchronization with the control point of the dragging operation until the control point disappears, or the target boundary overlaps the boundary of the audio track of the next background music segment in the target video, or the target boundary is moved to the endpoint position of the video track of the target video.

The target audio track may be the audio track of the to-be-extended music. The dragging operation may be an operation of extending the length of the target audio track to extend the to-be-extended music. Accordingly, the target boundary may be the boundary consistent with the target direction. For example, if the target audio track is disposed laterally, when the target direction is the right, the target boundary is the right boundary of the target audio track; and when the target direction is the left, the target boundary is the left boundary of the target audio track. The description is given in the following by using an example in which the target audio track is disposed laterally, and the target boundary is the right boundary of the target audio track.

In this embodiment, the user may also instruct the electronic device to extend the to-be-extended music by extending the target audio track of the to-be-extended music, so that the to-be-extended music is extended to any position corresponding to the dragging position of the dragging operation in the duration range of the target video according to different dragging positions. In this manner, the operation is simplified, the flexibility when the user extends a video is improved, and the diverse requirements of the user are satisfied.

Figure 5:
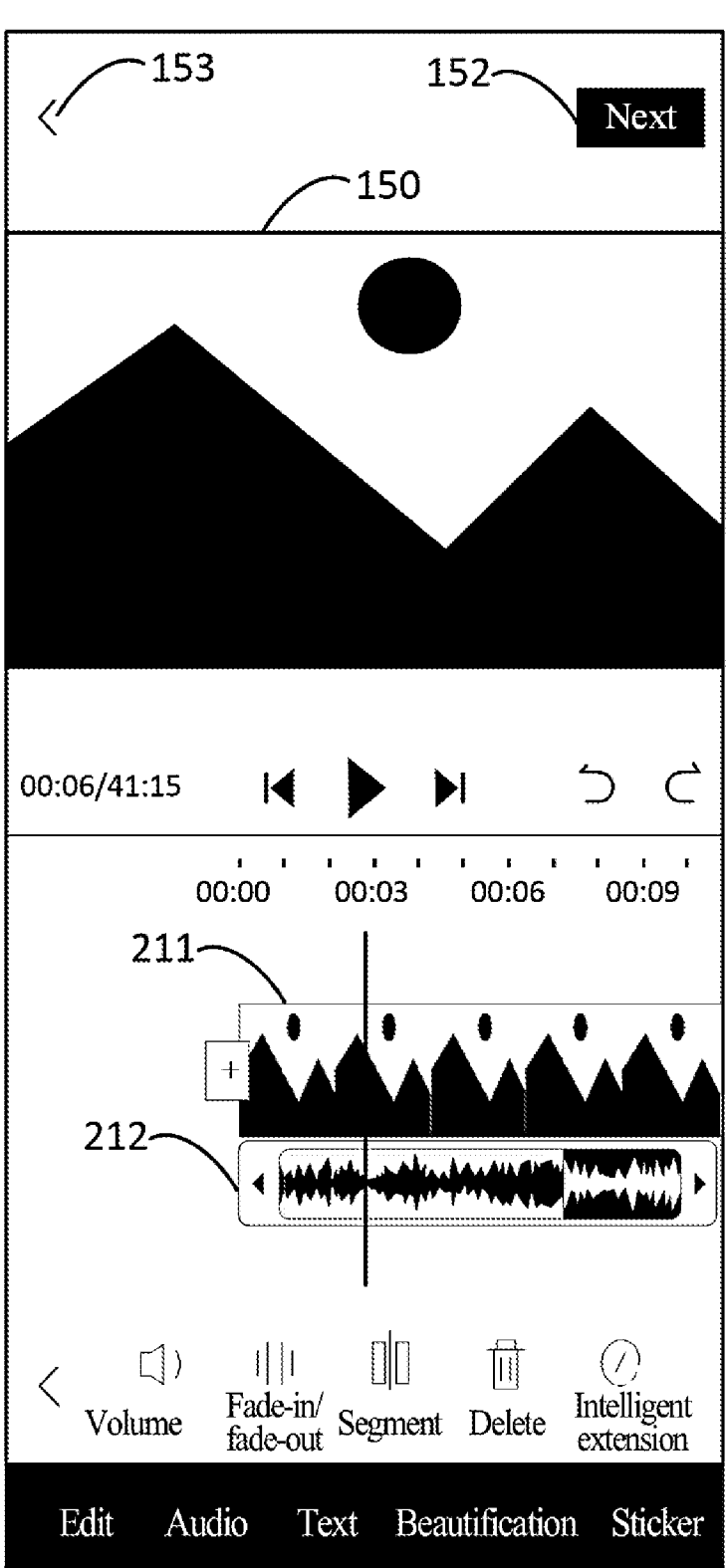
FIG. 5 is a diagram illustrating an extended target audio track according to an embodiment of the present disclosure.

As shown in FIG. 2, the electronic device displays a video track 211 of the target video and a target audio track 212 of the to-be-extended music in the editing area 21 of the editing interface. When the user intends to extend the to-be-extended music, the user may drag the right boundary of the target audio track 212 of the to-be-extended music to the right. Accordingly, when the electronic device monitors a dragging operation of the user, the right boundary of the target audio track 212 may be controlled to move to the right in synchronization with the control point of the dragging operation of the user until it is monitored that the control point of the dragging operation of the user disappears (that is, the user stops performing the dragging operation), or the right boundary of the target audio track overlaps the left boundary of the audio track of the next background music segment, or the right boundary of the target audio track is moved to the same line as the right boundary of the video track of the target video, as shown in FIG. 5.

When the to-be-extended music is extended forward, in this embodiment, the start position of the original music may not be considered. When the control point of the dragging operation disappears, or the boundary overlaps the boundary of the audio track of the previous background music segment in the target video, or the boundary is moved to the same line as the start boundary of the video track of the target video, controlling the start boundary of the target audio track to move in the direction of extending the target audio track is stopped. The start position of the original music may also be considered. When the control point of the dragging operation disappears, or the boundary overlaps the boundary of the audio track of the previous background music segment in the target video, or the boundary is moved to the same line as the start boundary of the video track of the target video, or the boundary is moved to the start boundary position of the original audio track of the original music (that is, the to-be-extended music is extended forward to the start of the original music), controlling the start boundary of the target audio track to move in the direction of extending the target audio track is stopped. In this manner, when the target video is played, the to-be-extended music added by the user is played before the target music segment acquired by the electronic device, so that the generated video is more in line with the addition intention of the user.

In S207, the moving distance of the target boundary is acquired, and the duration corresponding to the moving distance in the target audio track is used as the extension duration of the to-be-extended music.

In this embodiment, after controlling the target audio track of the to-be-extended music to move is stopped, the moving distance of the target boundary of the target track based on the dragging operation of the user may be determined, and the duration corresponding to the moving distance in the target audio track is determined as the extension duration of the to-be-extended music. That is, the difference between the duration of the target audio track after extension and the duration of the target audio track before extension is used as the extension duration of the to-be-extended music.

In an embodiment, before the moving distance of the target boundary is acquired, the method also includes determining that the target boundary is moved out of the original audio track of the original music corresponding to the to-be-extended music. The moving distance of the target boundary is acquired in the following manner: a moving distance after the target boundary is moved out of the original audio track is acquired.

The original audio track may be understood as the audio track of the original music corresponding to the to-be-extended music.

In the preceding embodiments, the electronic device may also extend the to-be-extended music by using the original music segment located behind the to-be-extended music in the original music. When the original music is used to extend the to-be-extended music, and the duration of the to-be-extended music still does not reach the expected duration, the target music segment is used to extend the to-be-extended music, so that the smoothness of the extended target music is improved.

For example, after the target boundary of the target audio track is no longer controlled to move in the target direction, whether the target boundary of the target audio track is located outside the original audio track of the original music may be first determined. If the target boundary of the target audio track is located outside the original audio track of the original music, the moving distance after the target boundary is moved out of the original audio track is acquired. That is, the distance between the target boundary when the target boundary stops moving and the corresponding boundary of the original audio track is acquired. The duration corresponding to the distance in the target audio track of the to-be-extended music is used as the extension duration of the to-be-extended music. If the target boundary of the target audio track is not located outside the original audio track of the original music, audio data in an audio track segment corresponding to the moving path of the target boundary in the original audio track may be used to extend the to-be-extended music. At this time, the target triggering operation includes the dragging operation of dragging the target boundary of the target audio track of the to-be-extended music in the target direction. The music extension method provided by this embodiment may also include the following: When the target boundary is not moved out of the original audio track of the original music corresponding to the to-be-extended music, corresponding audio data in the original audio track is used to extend the to-be-extended music. When the target boundary is not moved out of the original audio track, audio data between a first position in the original audio track corresponding to the moving start point of the target boundary and a second position in the original audio track corresponding to the moving end point of the target boundary is used to extend the to-be-extended music. For example, the audio data between the first position and the second position in the original audio track is spliced to the end of the original to-be-extended music.

In an embodiment, the music extension method provided by this embodiment may also include the following: When the target boundary is moved to the boundary of the original audio track, the moving speed of the target boundary is reduced; and/or when the target boundary is moved out of the original audio track, an audio track located outside the original audio track is displayed in a display state different from the target audio track.

In the preceding embodiments, when the target boundary is moved to the boundary of the original audio track, the moving speed of the target boundary is reduced to form a sense of stuttering to remind the user that the target boundary of the target audio track is moved to the boundary of the original audio track. Moreover/Alternatively, an audio track located outside the original audio track is displayed in a display state (such as a different color and/or a different background color) different from the audio track located inside the original audio track, as shown in FIG. 5. In this manner, the user can distinguish, thereby improving the user experience.

In this embodiment, the audio track located inside the original audio track and the audio track located outside the original audio track are displayed in different display states only to remind the user that the target boundary is moved out of the original audio track, and remind the length of the audio track located outside the original audio track, which does not limit the splicing position of the subsequent target audio segment. That is, in this embodiment, the audio data of the target music segment does not necessarily need to be spliced in the audio track located outside the original audio track, and the audio data may also be spliced at a position in the audio track inside the original audio track.

In S208, a target music segment is determined according to a music feature of the to-be-extended music and the extension duration.

In S209, the target music segment is spliced to a target position of the to-be-extended music to obtain the extended target music.

Figure 6:
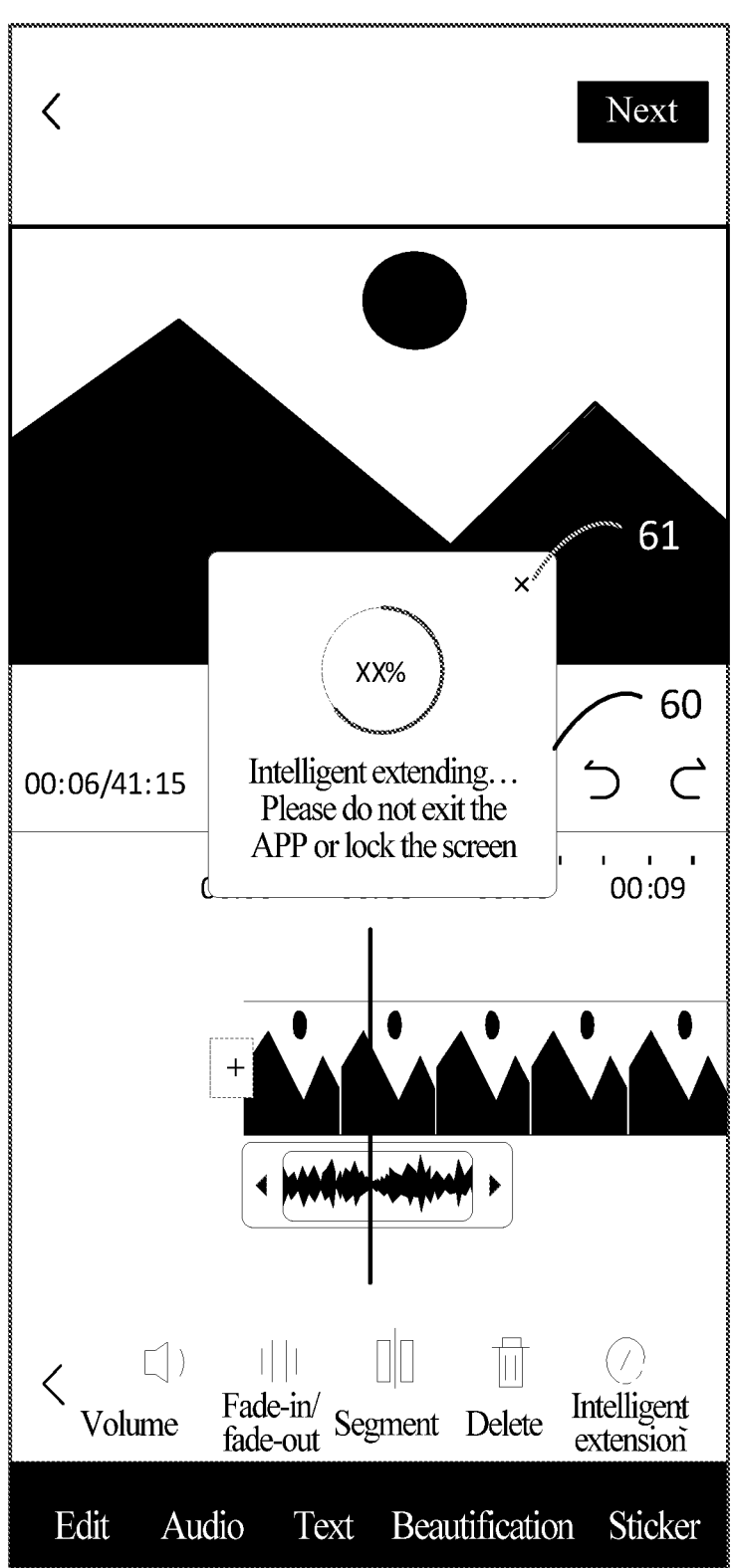
FIG. 6 is a diagram illustrating an extension prompt window according to an embodiment of the present disclosure.

In this embodiment, as shown in FIG. 6, when the target triggering operation is received to extend the to-be-extended music, for example, when S207 and S208 are performed, an extension prompt window 60 may also be displayed to prompt the user that the to-be-extended music is currently extended, and after the extension is completed, or when the user clicks a closing control 61 in the extension prompt window 60, the extension prompt window 60 may be closed. In addition, when the target music segment is not acquired, or the splicing between the to-be-extended music and the target music segment fails, a failure reminder message may be displayed on a boundary interface to prompt the user that the intelligent extension of the to-be-extended music fails.

In the music extension method provided by this embodiment, when the user triggers the intelligent extending control, or when the user drags the target boundary of the target audio track of the to-be-extended music in the target direction, the extension duration of the to-be-extended music can be automatically determined. The target music segment is selected to extend the to-be-extended music according to the extension duration and the music feature of the to-be-extended music. In this manner, on the premise that the ease of operation during music extension and the extension effect of the music are both taken into consideration, different extension requirements of the user for the to-be-extended music can be satisfied, thereby improving the user experience.

Figure 7:
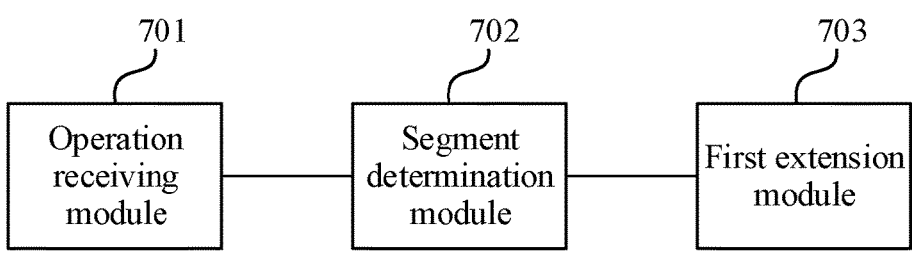
FIG. 7 is a block diagram illustrating the structure of a music extension apparatus according to an embodiment of the present disclosure.

FIG. 7 is a block diagram illustrating the structure of a music extension apparatus according to an embodiment of the present disclosure. The apparatus may be performed by software and/or hardware and may be configured in an electronic device. For example, the apparatus may be configured in a mobile phone or a tablet computer and may perform the music extension method to extend music. As shown in FIG. 7, the music extension apparatus provided by this embodiment may include an operation receiving module 701, a segment determination module 702, and a first extension module 703.

The operation receiving module 701 is configured to receive a target triggering operation of extending to-be-extended music. The segment determination module 702 is configured to, in response to the target triggering operation, determine a target music segment according to a music feature of the to-be-extended music. The first extension module 703 is configured to splice the target music segment to a target position of the to-be-extended music to obtain the extended target music.

In the music extension apparatus provided by this embodiment, the target triggering operation of extending the to-be-extended music is received by the operation receiving module 701. In response to the target triggering operation, the target music segment is determined by the segment determination module 702 according to the music feature of the to-be-extended music. The target music segment is spliced to the target position of the to-be-extended music by the first extension module 703 to obtain the extended target music. In the preceding technical schemes adopted by this embodiment, the user may instruct the electronic device to automatically use the target music segment corresponding to the music feature of the to-be-extended music to extend the to-be-extended music by performing a simple triggering operation. In this manner, the operation required for extending the music can be simplified, and at the same time, the situation that the switching between the to-be-extended music and the target music segment is too abrupt can be avoided. At the same time, the ease of operation during music extension and the extension effect of the music are both considered, and the user experience is improved.

The music extension apparatus provided by this embodiment may also include a duration determination module. The duration determination module is configured to, before the target music segment is determined according to the music feature of the to-be-extended music, determine extension duration of the to-be-extended music based on the target triggering operation. The segment determination module 702 may be configured to determine the target music segment according to the music feature of the to-be-extended music and the extension duration.

In the preceding schemes, the to-be-extended music is the background music of the target video. The target triggering operation may include a triggering operation performed on an intelligent extending control of the to-be-extended music. The duration determination module may include a first determination unit and a second determination unit. The first determination unit is configured to, when the to-be-extended music is the last background music segment in the target video, determine the duration between the music end position of the to-be-extended music and the video end position of the target video as the extension duration of the to-be-extended music.

The second determination unit is configured to, when the to-be-extended music is not the last background music segment in the target video, determine the duration between the music end position of the to-be-extended music and the music start position of the next background music segment in the target video as the extension duration of the to-be-extended music. The next music segment is the background music after the to-be-extended music and adjacent to the to-be-extended music.

In the preceding schemes, the to-be-extended music is the background music of the target video.

The target triggering operation may include a dragging operation of dragging a target boundary of the target audio track of the to-be-extended music in a target direction. The duration determination module may include a moving control unit and a third determination unit. The moving control unit is configured to control the target boundary to move in the target direction in synchronization with the control point of the dragging operation until the control point disappears, the target boundary overlaps the boundary of the audio track of the next background music segment in the target video, or the target boundary is moved to the endpoint position of the video track of the target video. The third determination unit is configured to acquire the moving distance of the target boundary and use the duration corresponding to the moving distance in the target audio track as the extension duration of the to-be-extended music.

In the preceding schemes, the duration determination module may also include a moving determination unit. The moving determination unit is configured to, before the moving distance of the target boundary is acquired, determine that the target boundary is moved out of the original audio track of the original music corresponding to the to-be-extended music. The third determination unit is configured to acquire the moving distance of the target boundary after the target boundary is moved out of the original audio track and use the duration corresponding to the moving distance in the target audio track as the extension duration of the to-be-extended music.

The target triggering operation includes the dragging operation of dragging the target boundary of the target audio track of the to-be-extended music in the target direction. The music extension apparatus provided by this embodiment may also include a second extension module. The second extension module is configured to, when the target boundary is not moved out of the original audio track of the original music corresponding to the to-be-extended music, use the corresponding audio data in the original audio track to extend the to-be-extended music.

In the preceding schemes, the duration determination module may also include a speed reduction unit and/or a track display unit. The speed reduction unit is configured to, when the target boundary is moved to the boundary of the original audio track, reduce the moving speed of the target boundary. The track display unit is configured to, when the target boundary is moved out of the original audio track, display an audio track located outside the original audio track in a display state different from the target audio track.

In the preceding schemes, the segment determination module 702 may include a first segment determination unit or a second segment determination unit. The first segment determination unit is configured to intercept a music segment whose duration matches the extension duration from the original music corresponding to the to-be-extended music and use the intercepted music segment as the target music segment according to the music feature of the to-be-extended music. The second segment determination unit is configured to determine, according to the music feature of the to-be-extended music, similar music of the to-be-extended music, intercept a music segment whose duration matches the extension duration from the similar music, and use the music segment as the intercepted target music segment.

In the preceding schemes, the to-be-extended music is the background music of the target video. The music extension apparatus provided by this embodiment may also include a feature determination module. The feature determination module is configured to, before the target music segment is determined according to the music feature of the to-be-extended music, determine a video feature of the target video. The segment determination module 702 may be configured to determine the target music segment according to the music feature of the to-be-extended music and the video feature.

The music extension apparatus provided by this embodiment of the present disclosure may execute the music extension method provided by any embodiment of the present disclosure and has the corresponding functional modules and effects when the music extension method is executed. For technical details not described in detail in this embodiment, reference may be made to the music extension method according to any embodiment of the present disclosure.

Figure 8:
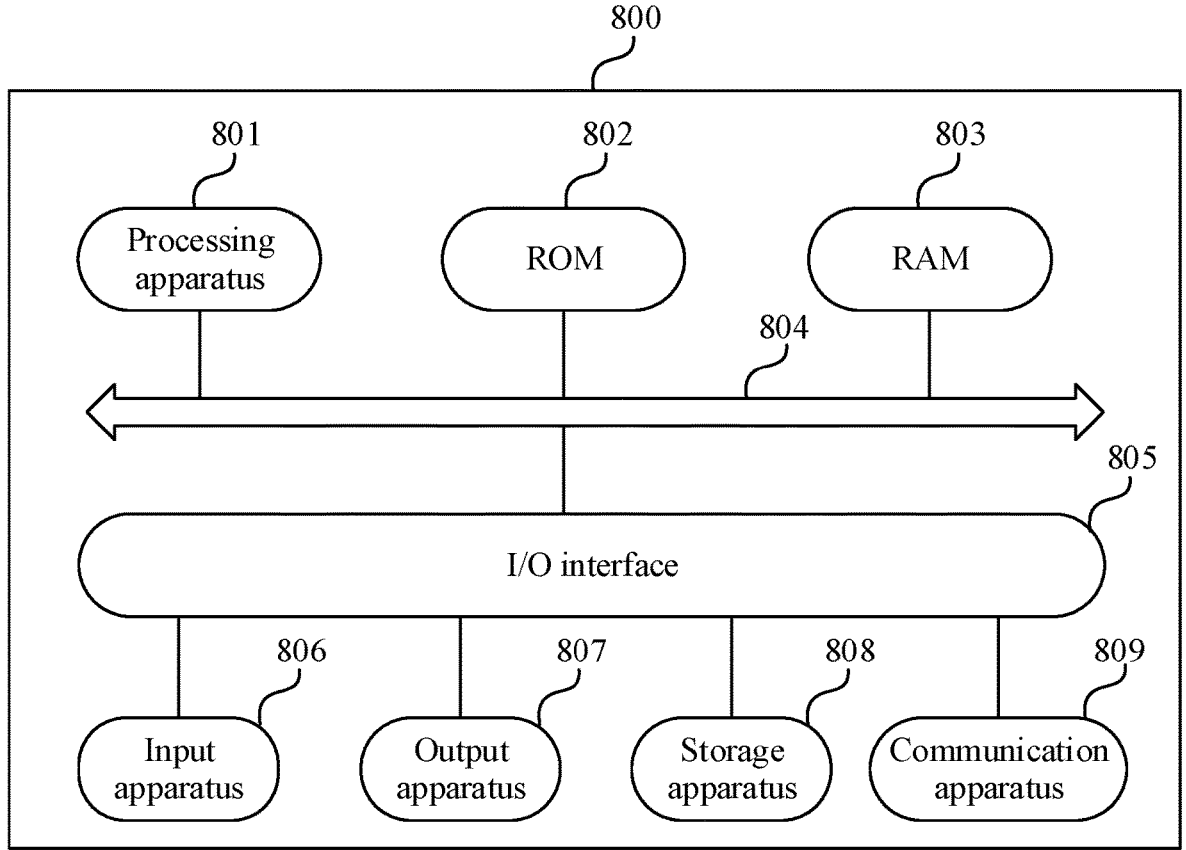
FIG. 8 is a diagram illustrating the structure of an electronic device according to an embodiment of the present disclosure.

Referring to FIG. 8, FIG. 8 shows a diagram illustrating the structure of an electronic device 800 (for example, a terminal device) applicable to implementing the embodiments of the present disclosure. The terminal device in the embodiments of the present disclosure may include, but is not limited to, mobile terminals such as a mobile phone, a laptop, a digital broadcast receiver, a personal digital assistant (PDA), a pad, a portable media player (PMP), and an in-vehicle terminal (such as an in-vehicle navigation terminal), and stationary terminals such as a digital television (TV) and a desktop computer. The electronic device shown in FIG. 8 is merely an example and is not intended to limit the function and usage scope of the embodiments of the present disclosure.

As shown in FIG. 8, the electronic device 800 may include a processing apparatus (such as a central processing unit and a graphics processing unit) 801. The processing apparatus 801 may execute multiple appropriate actions and processing according to a program stored in a read-only memory (ROM) 802 or a program loaded into a random-access memory (RAM) 803 from a storage apparatus 808. The RAM 803 also stores various programs and data required for the operation of the electronic device 800. The processing apparatus 801, the ROM 802, and the RAM 803 are connected to each other through a bus 804. An input/output (I/O) interface 805 is also connected to the bus 804.

Generally, the following apparatuses may be connected to the I/O interface 805: an input apparatus 806 such as a touch screen, a touch pad, a keyboard, a mouse, a camera, a microphone, an accelerometer, and a gyroscope; an output apparatus 807 such as a liquid crystal display (LCD), a speaker, and a vibrator; the storage apparatus 808 such as a magnetic tape and a hard disk; and a communication apparatus 809. The communication apparatus 809 may allow the electronic device 800 to perform wireless or wired communication with other devices to exchange data. Although FIG. 8 shows the electronic device 800 having various apparatuses, not all the apparatuses shown here need to be implemented or present. Alternatively, more or fewer apparatuses may be implemented or present.

According to the embodiments of the present disclosure, the process described above with reference to the flowchart may be implemented as a computer software program. For example, the embodiments of the present disclosure include a computer program product. The computer program product includes a computer program carried in a non-transitory computer-readable medium. The computer program includes program codes for executing the method shown in the flowchart. In such an embodiment, the computer program may be downloaded from a network and installed through the communication apparatus 809, or may be installed from the storage apparatus 808, or may be installed from the ROM 802. When the computer program is executed by the processing apparatus 801, the preceding functions defined in the method of the embodiments of the present disclosure are executed.

The computer-readable medium described above in the present disclosure may be a computer-readable signal medium or a computer-readable storage medium or any combination thereof. The computer-readable storage medium, for example, may be, but is not limited to, an electronic, magnetic, optical, electromagnetic, infrared, or semiconductor system, apparatus or device, or any combination thereof. An example of the computer-readable storage medium may include, but is not limited to, an electrical connection having one or more wires, a portable computer magnetic disk, a hard disk, a RAM, a ROM, an erasable programmable read-only memory (EPROM), a flash memory, an optical fiber, a portable compact disc read-only memory (CD-ROM), an optical storage device, a magnetic storage device, or any suitable combination thereof. In the present disclosure, the computer-readable storage medium may be any tangible medium including or storing a program. The program may be used by or used in conjunction with an instruction execution system, apparatus, or device. In the present disclosure, the computer-readable signal medium may include a data signal propagated on a baseband or as a part of a carrier, and computer-readable program codes are carried in the data signal. The data signal propagated in this manner may be in multiple forms and includes, but is not limited to, an electromagnetic signal, an optical signal, or any suitable combination thereof. The computer-readable signal medium may also be any computer-readable medium other than the computer-readable storage medium. The computer-readable signal medium may send, propagate, or transmit a program used by or in conjunction with an instruction execution system, apparatus, or device. The program codes included in the computer-readable medium may be transmitted in any suitable medium, including, but not limited to, a wire, an optical cable, a radio frequency (RF), or any suitable combination thereof.

In some embodiments, clients and servers may communicate using any currently known or future developed network protocol, such as the hypertext transfer protocol (HTTP), and may be interconnected with any form or medium of digital data communication (for example, a communication network). Examples of the communication network include a local area network (LAN), a wide area network (WAN), an internet (for example, the Internet), a peer-to-peer network (for example, an Ad-Hoc network), and any network currently known or to be developed in the future.

The preceding computer-readable medium may be included in the preceding electronic device or may exist alone without being assembled into the electronic device.

The preceding computer-readable medium carries one or more programs. When the one or more programs are executed by the electronic device, the electronic device is configured to: receive the target triggering operation of extending the to-be-extended music; in response to the target triggering operation, determine the target music segment according to the music feature of the to-be-extended music; and splice the target music segment to the target position of the to-be-extended music to obtain the extended target music.

Computer program codes for performing the operations in the present disclosure may be written in one or more programming languages or combination thereof. The preceding one or more programming languages include, but are not limited to, object-oriented programming languages such as Java, Smalltalk, and C++, as well as conventional procedural programming languages such as C or similar programming languages. Program codes may be executed entirely on a user computer, partly on a user computer, as a stand-alone software package, partly on a user computer and partly on a remote computer, or entirely on a remote computer or a server. In the case involving the remote computer, the remote computer may be connected to the user computer through any type of network including a LAN or a WAN, or may be connected to an external computer (for example, via the Internet through an Internet service provider).

The flowcharts and block diagrams in the drawings show possible architectures, functions, and operations of the system, method, and computer program product according to multiple embodiments of the present disclosure. In this regard, each block in the flowcharts or block diagrams may represent a module, a program segment, or part of codes that contains one or more executable instructions for implementing specified logical functions. It is also to be noted that in some alternative implementations, the functions marked in the blocks may occur in an order different from those marked in the drawings. For example, two successive blocks may, in fact, be executed substantially in parallel or in a reverse order, which depends on the functions involved.

It is also to be noted that each block in the block diagrams and/or flowcharts and a combination of blocks in the block diagrams and/or flowcharts may be implemented by a special-purpose hardware-based system which executes specified functions or operations, or a combination of special-purpose hardware and computer instructions.

The units involved in the embodiments of the present disclosure may be implemented by software or hardware. The name of a module is not intended to limit the unit in a certain circumstance.

The functions described above herein may be executed, at least partially, by one or more hardware logic components. For example, without limitation, exemplary types of hardware logic components that may be used include a field programmable gate array (FPGA), an application specific integrated circuit (ASIC), application specific standard parts (ASSP), a system-on-chip (SOC), a complex programmable logic device (CPLD), and so on.

In the context of the present disclosure, the machine-readable medium may be a tangible medium that may include or store a program that is used by or used in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination thereof. Examples of the machine-readable storage medium may include an electrical connection based on one or more wires, a portable computer disk, a hard disk, a RAM, a ROM, an EPROM or a flash memory, an optical fiber, a CD-ROM, an optical storage device, a magnetic storage device, or any suitable combination thereof.

According to one or more embodiments of the present disclosure, example one provides a music extension method including the following:

A target triggering operation of extending to-be-extended music is received.

In response to the target triggering operation, a target music segment is determined according to a music feature of the to-be-extended music.

The target music segment is spliced to a target position of the to-be-extended music to obtain the extended target music.

According to one or more embodiments of the present disclosure, in example two based on the method described in example one, before the target music segment is determined according to the music feature of the to-be-extended music, the method also includes the following:

Extension duration of the to-be-extended music is determined based on the target triggering operation.

The step in which the target music segment is determined according to the music feature of the to-be-extended music includes the following:

The target music segment is determined according to the music feature of the to-be-extended music and the extension duration.

According to one or more embodiments of the present disclosure, in example three based on the steps below according to the method described in example one, the to-be-extended music is the background music of the target video.

The target triggering operation includes a triggering operation performed on an intelligent extending control of the to-be-extended music. The step in which the extension duration of the to-be-extended music is determined based on the target triggering operation includes the following:

If the to-be-extended music is the last background music segment in the target video, the duration between the music end position of the to-be-extended music and the video end position of the target video is determined as the extension duration of the to-be-extended music.

If the to-be-extended music is not the last background music segment in the target video, the duration between the music end position of the to-be-extended music and the music start position of the next background music segment in the target video is determined as the extension duration of the to-be-extended music. The next music segment is the background music after the to-be-extended music and adjacent to the to-be-extended music.

According to one or more embodiments of the present disclosure, in example four based on the method described in example two, the to-be-extended music is the background music of the target video. The target triggering operation includes a dragging operation of dragging the target boundary of the target audio track of the to-be-extended music in the target direction. The step in which the extension duration of the to-be-extended music is determined based on the target triggering operation includes the following:

The target boundary is controlled to move in the target direction in synchronization with the control point of the dragging operation until the control point disappears, the target boundary overlaps the boundary of the audio track of the next background music segment in the target video, or the target boundary is moved to the endpoint position of the video track of the target video; and the moving distance of the target boundary is acquired, and the duration corresponding to the moving distance in the target audio track is used as the extension duration of the to-be-extended music.

According to one or more embodiments of the present disclosure, in example five based on the method described in example four, before the moving distance of the target boundary is acquired, the method also includes the following:

It is determined that the target boundary is moved out of the original audio track of the original music corresponding to the to-be-extended music.

The moving distance of the target boundary is acquired in the following manner.

The moving distance of the target boundary after the target boundary is moved out of the original audio track is acquired.

According to one or more embodiments of the present disclosure, in example six based on the method described in example one, the target triggering operation includes the dragging operation of dragging the target boundary of the target audio track of the to-be-extended music in the target direction. The method also includes the following:

When the target boundary is not moved out of the original audio track of the original music corresponding to the to-be-extended music, corresponding audio data in the original audio track is used to extend the to-be-extended music.

According to one or more embodiments of the present disclosure, in example seven based on the method described in example five or six, the method also includes the following:

When the target boundary is moved to the boundary of the original audio track, the moving speed of the target boundary is reduced; and/or when the target boundary is moved out of the original audio track, an audio track located outside the original audio track is displayed in a display state different from the target audio track.

According to one or more embodiments of the present disclosure, in example eight based on the method described in any one of examples two to six, the target music segment is determined according to the music feature of the to-be-extended music and the extension duration in the following manner:

The music segment whose duration matches the extension duration is intercepted according to the music feature of the to-be-extended music from the original music corresponding to the to-be-extended music and used as the target music segment.

Alternatively, according to the music feature of the to-be-extended music, similar music of the to-be-extended music is determined, and a music segment whose duration matches the extension duration is intercepted from the similar music and used as the target music segment.

According to one or more embodiments of the present disclosure, in example nine based on the method described in example one, the to-be-extended music is the background music of the target video. Before the target music segment is determined according to the music feature of the to-be-extended music, the method also includes the following.

A video feature of the target video is determined.

The target music segment is determined according to the music feature of the to-be-extended music in the following manner:

The target music segment is determined according to the music feature of the to-be-extended music and the video feature.

According to one or more embodiments of the present disclosure, example ten provides a music extension apparatus. The apparatus includes an operation receiving module, a segment determination module, and a first extension module.

The operation receiving module is configured to receive a target triggering operation of extending to-be-extended music.

The segment determination module is configured to, in response to the target triggering operation, determine a target music segment according to a music feature of the to-be-extended music.

The first extension module is configured to splice the target music segment to a target position of the to-be-extended music to obtain the extended target music.

According to one or more embodiments of the present disclosure, example eleven provides an electronic device. The device includes one or more processors and a memory configured to store one or more programs.

When executed by the one or more processors, the one or more programs cause the one or more processors to perform the music extension method according to any one of examples one to nine.

According to one or more embodiments of the present disclosure, example twelve provides a computer-readable storage medium. The storage medium stores a computer program. When executed by a processor, the program causes the processor to perform the music extension method according to any one of examples one to nine.

In addition, although multiple operations are depicted in a particular order, this should not be construed as requiring that such operations should be performed in the particular order shown or in a sequential order. In certain circumstances, multitasking and parallel processing may be advantageous. Similarly, although implementation details are included in the preceding discussion, these should not be construed as limiting the scope of the present disclosure. Some features described in the context of separate embodiments may also be implemented in combination in a single embodiment. Conversely, various features described in the context of a single embodiment may also be implemented in multiple embodiments, individually or in any suitable subcombination.

What is claimed is:

1. A music extension method, being executed by an electronic device and comprising:

receiving a triggering operation for extending to-be-extended music;

determining a target music segment according to a music feature of the to-be-extended music based on the triggering operation; and adding the target music segment to a target position of the to-be-extended music to obtain extended target music;

wherein determining the target music segment according to the music feature of the to-be-extended music based on the triggering operation comprises:

determining extension duration of the to-be-extended music based on the triggering operation; and determining the target music segment according to the music feature of the to-be-extended music and the extension duration.

2. The method according to claim 1, wherein the to-be-extended music is background music of a target video, the triggering operation comprises an operation performed on an extending control for extending the to-be-extended music, and determining the extension duration of the to-be-extended music based on the triggering operation comprises:

in response to the to-be-extended music being a last background music segment in the target video, determining duration between a music end position of the to-be-extended music and a video end position of the target video as the extension duration of the to-be-extended music; or in response to the to-be-extended music not being a last background music segment in the target video, determining duration between a music end position of the to-be-extended music and a music start position of a next background music segment in the target video as the extension duration of the to-be-extended music, wherein the next background music segment is background music after the to-be-extended music and adjacent to the to-be-extended music.

3. The method according to claim 1, wherein the to-be-extended music is background music of a target video, the triggering operation comprises a dragging operation of dragging a target boundary of a target audio track of the to-be-extended music in a target direction, and determining the extension duration of the to-be-extended music based on the triggering operation comprises:

controlling the target boundary to move in the target direction in synchronization with a control point of the dragging operation until one of the following is satisfied: the control point disappears, the target boundary overlaps a boundary of an audio track of a next background music segment in the target video, or the target boundary is moved to an endpoint position of a video track of the target video; and acquiring a moving distance of the target boundary and using duration corresponding to the moving distance in the target audio track as the extension duration of the to-be-extended music.

4. The method according to claim 3, wherein the target audio track is an audio track of the to-be-extended music, and before acquiring the moving distance of the target boundary, the method further comprises:

determining that the target boundary is moved out of an original audio track of original music corresponding to the to-be-extended music, wherein the original music comprises the to-be-extended music and music corresponding to the to-be-extended music before editing; and acquiring the moving distance of the target boundary comprises:

acquiring the moving distance of the target boundary after the target boundary is moved out of the original audio track.

5. The method according to claim 4, further comprising at least one of the following:

in response to the target boundary being moved to a boundary of the original audio track, reducing a moving speed of the target boundary; or in response to the target boundary being moved out of the original audio track, displaying an audio track located outside the original audio track in a display state different from the target audio track.

6. The method according to claim 1, wherein the triggering operation comprises a dragging operation of dragging a target boundary of a target audio track of the to-be-extended music in a target direction, and the method further comprises:

in response to the target boundary not being moved out of an original audio track of original music corresponding to the to-be-extended music, using audio data corresponding to the dragging operation in the original audio track to extend the to-be-extended music.

7. The method according to claim 6, further comprising at least one of the following:

in response to the target boundary being moved to a boundary of the original audio track, reducing a moving speed of the target boundary; or in response to the target boundary being moved out of the original audio track, displaying an audio track located outside the original audio track in a display state different from the target audio track.

8. The method according to claim 1, wherein determining the target music segment according to the music feature of the to-be-extended music and the extension duration comprises:

according to the music feature of the to-be-extended music, intercepting, from original music corresponding to the to-be-extended music, a music segment with duration matching the extension duration and using the intercepted music segment as the target music segment; or according to the music feature of the to-be-extended music, determining similar music of the to-be-extended music, intercepting a music segment with duration matching the extension duration from the similar music, and using the intercepted music segment as the target music segment.

9. The method according to claim 1, wherein the to-be-extended music is background music of a target video, and before determining the target music segment according to the music feature of the to-be-extended music based on the triggering operation, the method further comprises:

determining a video feature of the target video; and determining the target music segment according to the music feature of the to-be-extended music comprises:

determining the target music segment according to the music feature of the to-be-extended music and the video feature.

10. An electronic device, comprising:

at least one processor; and a memory configured to store at least one program, wherein the at least one program, when executed by the at least one processor, causes the at least one processor to perform the following:

receiving a triggering operation for extending to-be-extended music;

determining a target music segment according to a music feature of the to-be-extended music based on the triggering operation; and adding the target music segment to a target position of the to-be-extended music to obtain extended target music;

wherein determining the target music segment according to the music feature of the to-be-extended music based on the triggering operation comprises:

determining extension duration of the to-be-extended music based on the triggering operation; and determining the target music segment according to the music feature of the to-be-extended music and the extension duration.

11. The electronic device according to claim 10, wherein the to-be-extended music is background music of a target video, the triggering operation comprises an operation performed on an extending control for extending the to-be-extended music, and the at least one processor is caused to perform determining the extension duration of the to-be-extended music based on the triggering operation by:

in response to the to-be-extended music being a last background music segment in the target video, determining duration between a music end position of the to-be-extended music and a video end position of the target video as the extension duration of the to-be-extended music; or in response to the to-be-extended music not being a last background music segment in the target video, determining duration between a music end position of the to-be-extended music and a music start position of a next background music segment in the target video as the extension duration of the to-be-extended music, wherein the next background music segment is background music after the to-be-extended music and adjacent to the to-be-extended music.

12. The electronic device according to claim 10, wherein the to-be-extended music is background music of a target video, the triggering operation comprises a dragging operation of dragging a target boundary of a target audio track of the to-be-extended music in a target direction, and the at least one processor is caused to perform determining the extension duration of the to-be-extended music based on the triggering operation by:

controlling the target boundary to move in the target direction in synchronization with a control point of the dragging operation until one of the following is satisfied: the control point disappears, the target boundary overlaps a boundary of an audio track of a next background music segment in the target video, or the target boundary is moved to an endpoint position of a video track of the target video; and acquiring a moving distance of the target boundary and using duration corresponding to the moving distance in the target audio track as the extension duration of the to-be-extended music.

13. The electronic device according to claim 12, wherein the target audio track is an audio track of the to-be-extended music, and before acquiring the moving distance of the target boundary, the at least one processor is caused to further perform:

determining that the target boundary is moved out of an original audio track of original music corresponding to the to-be-extended music, wherein the original music comprises the to-be-extended music and music corresponding to the to-be-extended music before editing; and the at least one processor is caused to perform acquiring the moving distance of the target boundary by:

acquiring the moving distance of the target boundary after the target boundary is moved out of the original audio track.

14. The electronic device according to claim 13, wherein the at least one processor is caused to further perform at least one of the following:

in response to the target boundary being moved to a boundary of the original audio track, reducing a moving speed of the target boundary; or in response to the target boundary being moved out of the original audio track, displaying an audio track located outside the original audio track in a display state different from the target audio track.

15. The electronic device according to claim 10, wherein the triggering operation comprises a dragging operation of dragging a target boundary of a target audio track of the to-be-extended music in a target direction, and the at least one processor is caused to further perform:

in response to the target boundary not being moved out of an original audio track of original music corresponding to the to-be-extended music, using audio data corresponding to the dragging operation in the original audio track to extend the to-be-extended music.

16. The electronic device according to claim 10, wherein the at least one processor is caused to further perform determining the target music segment according to the music feature of the to-be-extended music and the extension duration by:

according to the music feature of the to-be-extended music, intercepting, from original music corresponding to the to-be-extended music, a music segment with duration matching the extension duration and using the intercepted music segment as the target music segment; or according to the music feature of the to-be-extended music, determining similar music of the to-be-extended music, intercepting a music segment with duration matching the extension duration from the similar music, and using the intercepted music segment as the target music segment.

17. The electronic device according to claim 10, wherein the to-be-extended music is background music of a target video, and before determining the target music segment according to the music feature of the to-be-extended music based on the triggering operation, the at least one processor is caused to further perform:

determining a video feature of the target video; and the at least one processor is caused to perform determining the target music segment according to the music feature of the to-be-extended music by:

determining the target music segment according to the music feature of the to-be-extended music and the video feature.

18. A non-transitory computer-readable storage medium, storing a computer program, wherein the program, when executed by a processor, causes the processor to perform a music extension method, wherein the music extension method comprises:

receiving a triggering operation for extending to-be-extended music;

determining a target music segment according to a music feature of the to-be-extended music based on the triggering operation; and adding the target music segment to a target position of the to-be-extended music to obtain extended target music;

wherein determining the target music segment according to the music feature of the to-be-extended music based on the triggering operation comprises:

determining extension duration of the to-be-extended music based on the triggering operation; and determining the target music segment according to the music feature of the to-be-extended music and the extension duration.

19. The storage medium according to claim 18, wherein the to-be-extended music is background music of a target video, the triggering operation comprises an operation performed on an extending control for extending the to-be-extended music, and determining the extension duration of the to-be-extended music based on the triggering operation comprises:

in response to the to-be-extended music being a last background music segment in the target video, determining duration between a music end position of the to-be-extended music and a video end position of the target video as the extension duration of the to-be-extended music; or in response to the to-be-extended music not being a last background music segment in the target video, determining duration between a music end position of the to-be-extended music and a music start position of a next background music segment in the target video as the extension duration of the to-be-extended music, wherein the next background music segment is background music after the to-be-extended music and adjacent to the to-be-extended music.

20. The storage medium according to claim 18, wherein the to-be-extended music is background music of a target video, the triggering operation comprises a dragging operation of dragging a target boundary of a target audio track of the to-be-extended music in a target direction, and determining the extension duration of the to-be-extended music based on the triggering operation comprises:

controlling the target boundary to move in the target direction in synchronization with a control point of the dragging operation until one of the following is satisfied: the control point disappears, the target boundary overlaps a boundary of an audio track of a next background music segment in the target video, or the target boundary is moved to an endpoint position of a video track of the target video; and acquiring a moving distance of the target boundary and using duration corresponding to the moving distance in the target audio track as the extension duration of the to-be-extended music.

* * * * *